(12) United States Patent
Uehara et al.

(10) Patent No.: US 11,912,181 B2
(45) Date of Patent: Feb. 27, 2024

(54) SUSPENSION SEAT

(71) Applicant: NHK SPRING CO., LTD., Yokohama (JP)

(72) Inventors: Shinji Uehara, Yokohama (JP); Satoshi Yaegashi, Yokohama (JP); Ryusei Nakamura, Yokohama (JP); Yuki Uchisawa, Yokohama (JP)

(73) Assignee: NHK SPRING Co., Ltd., Yokohama (JP)

( * ) Notice: Subject to any disclaimer, the term of this patent is extended or adjusted under 35 U.S.C. 154(b) by 722 days.

(21) Appl. No.: 17/021,941

(22) Filed: Sep. 15, 2020

(65) Prior Publication Data

US 2021/0086668 A1 Mar. 25, 2021

(30) Foreign Application Priority Data

Sep. 20, 2019 (JP) .................................. 2019-171725

(51) Int. Cl.
*B60N 2/50* (2006.01)
*B60N 2/52* (2006.01)

(52) U.S. Cl.
CPC ............. *B60N 2/502* (2013.01); *B60N 2/501* (2013.01); *B60N 2/507* (2013.01); *B60N 2/52* (2013.01); *B60N 2/505* (2013.01); *B60N 2205/20* (2013.01)

(58) Field of Classification Search
CPC .......... B60N 2/502; B60N 2/52; B60N 2/507; B60N 2/501; B60N 2/505; B60N 2205/20
See application file for complete search history.

(56) References Cited

U.S. PATENT DOCUMENTS

| 5,169,113 | A | * | 12/1992 | Brodersen | .............. | B60N 2/501 |
| | | | | | | 248/421 |
| 2018/0001804 | A1 | * | 1/2018 | Lorey | ..................... | B60N 2/502 |
| 2019/0315254 | A1 | * | 10/2019 | Tucker | ................... | B60N 2/502 |

FOREIGN PATENT DOCUMENTS

| DE | 102017130450 | A1 | * | 6/2019 | ............. | B60N 2/502 |
| FR | 3052405 | A1 | * | 12/2017 | | |
| FR | 3055260 | A1 | * | 3/2018 | | |

(Continued)

OTHER PUBLICATIONS

Office Action issued in the corresponding Japanese Patent Application No. 2019-171725, dated Aug. 15, 2023 in 6 pages including English translation.

*Primary Examiner* — Vishal R Sahni
(74) *Attorney, Agent, or Firm* — Knobbe, Martens, Olson & Bear, LLP

(57) ABSTRACT

A suspension seat, including: a lower side member that forms a vehicle lower side of a suspension; an upper side member that forms a vehicle upper side of the suspension, and that is configured to support a vehicle seat body from the vehicle lower side; a suspension link mechanism that includes a vehicle lower side portion coupled to the lower side member and a vehicle upper side portion coupled to the upper side member, and that undergoes displacement so as to displace the upper side member along a vehicle vertical direction; a linear displacement section that is provided at the suspension link mechanism and is configured to undergo linear displacement in conjunction with displacement of the suspension link mechanism; and a locking mechanism that immobilizes the linear displacement section so as to immobilize displacement of the suspension link mechanism.

5 Claims, 7 Drawing Sheets

(56) References Cited

FOREIGN PATENT DOCUMENTS

| | | | |
|---|---|---|---|
| FR | 3055843 A1 * | 3/2018 | |
| JP | S61-98634 A | 5/1986 | |
| JP | H05-238298 A | 9/1993 | |
| JP | 2011-225177 A | 11/2011 | |
| JP | 2011225177 A * | 11/2011 | |
| WO | WO-2016050823 A1 * | 4/2016 | ............... B60N 2/06 |

* cited by examiner

SUSPENSION SEAT

CROSS-REFERENCE TO RELATED APPLICATION

This application is based on and claims priority under 35 USC 119 from Japanese Patent Application No. 2019-171725 filed on Sep. 20, 2019, the disclosure of which is incorporated by reference herein.

BACKGROUND

Technical Field

The present disclosure relates to a suspension seat.

Related Art

Japanese Patent Application Laid-Open (JP-A) No. 2011-225177 discloses an air suspension-type vehicle seat support device provided with a suspension locking means. The suspension locking means locks operation of a link mechanism that supports an upper frame such that the upper frame is capable of moving up and down with respect to a lower frame so as to fix a suspension height position. The link mechanism includes a pair of X-links, each configured by combining two link bars a link shaft to form an X shape, and a front-lower side movable shaft that couples vehicle front sides and vehicle lower sides of the pair of X-links together. The front-lower side movable shaft is capable of moving along a vehicle horizontal direction accompanying vertical movement of the upper frame, and a gear arm engages with the front-lower side movable shaft so as to swing accompanying this vertical movement. Movement of the front-lower side movable shaft in the vehicle horizontal direction is locked by a lock gear that is rotation-driven by an air spring so as to mesh with the gear arm. This enables the suspension to be fixed at the desired seat height.

However, in the air suspension-type vehicle seat support device of the above-described structure, the gear arm and the lock gear that configure the suspension immobilizing mechanism are coupled together through plural link members, resulting in a mechanism with a complex configuration. Moreover, with this suspension immobilizing mechanism, a space is provided between a floor panel and the vehicle lower side of the lower frame in order to allow swinging of the gear arm and the lock gear that are coupled together through the plural link members. A suspension immobilizing mechanism with a simple configuration is thus desirable.

SUMMARY

In consideration of the above circumstances, an object of the present disclosure is to obtain a suspension seat including a locking mechanism that has a simple configuration and is capable of immobilizing a suspension at a position within vehicle vertical direction displacement range of a seat.

A suspension seat of a first aspect of the present disclosure includes a lower side member that forms a portion of a suspension, at a lower side in a vertical direction of a vehicle, and that is coupled to a floor section of a vehicle cabin, an upper side member that forms a portion of the suspension, at an upper side in the vehicle vertical direction, that is disposed at a vehicle lower side of a vehicle seat body, and that is configured to support the vehicle seat body from the vehicle lower side, a suspension link mechanism that includes a vehicle lower side portion coupled to the lower side member and a vehicle upper side portion coupled to the upper side member, and that undergoes displacement so as to displace the upper side member along a vehicle vertical direction, a linear displacement section that is provided at the suspension link mechanism and is configured to undergo linear displacement in conjunction with displacement of the suspension link mechanism, a biasing unit that is provided at the vehicle lower side of the upper side member and is configured to bias the upper side member toward the vehicle upper side, a damping unit that includes an end portion coupled to the suspension link mechanism at the vehicle lower side of the upper side member and that is configured to absorb vibration generated at the suspension link mechanism, and a locking mechanism that immobilizes the linear displacement section so as to immobilize displacement of the suspension link mechanism, the locking mechanism including a displaceable member having one end portion fixed to the linear displacement section and configured to undergo linear displacement integrally with the linear displacement section along a displacement direction of the linear displacement section, and having another end portion provided with a lockable portion, the locking mechanism including an immobilizing member provided on the other end portion side of the displaceable member and including a lock portion formed at a portion of the immobilizing member opposing the lockable portion and configured to immobilize the lockable portion at a position within a displacement range of the displaceable member.

In the suspension seat of the first aspect of the present disclosure, the locking mechanism includes the displaceable member that is configured to undergo linear displacement integrally with the linear displacement section along the displacement direction of the linear displacement section, and the immobilizing member that is capable of immobilizing the other end portion of the displaceable member at a position within the displacement range of the displaceable member. The one end portion of the displaceable member is fixed to the linear displacement section, and the displaceable member is provided along the linear displacement direction of the linear displacement section. This enables the displaceable member and the immobilizing member to be formed simply, for example using rod shaped or plate shaped members at a vehicle rear side of the linear displacement section. Moreover, the immobilizing member is formed with the lock portion provided at a portion of the immobilizing member opposing the lockable portion and configured to immobilize the lockable portion at a position within the displacement range of the displaceable member. This enables the locking mechanism to be configured simply, and also enables the suspension to be immobilized at a position within a vehicle vertical direction displacement range of the seat.

A suspension seat of a second aspect of the present disclosure is the suspension seat of the first aspect of the present disclosure, wherein the locking mechanism is electrically connected to a seating sensor disposed in the vehicle seat body, or to a buckle switch configured to detect attachment and detachment of a seatbelt with respect to a seatbelt buckle of a seatbelt device installed in the vehicle cabin, and linear displacement of the displaceable member is immobilized by driving the immobilizing member in a case in which the seating sensor has detected departure of a seated occupant from the vehicle seat body, or in a case in which the buckle switch has detected the seated occupant removing the seatbelt.

In the suspension seat of the second aspect of the present disclosure, the locking mechanism is electrically connected to the seating sensor disposed in the vehicle seat body or to the buckle switch provided at the seatbelt buckle installed in the vehicle cabin. The immobilizing member of the locking mechanism is capable of immobilizing the displaceable member so as to immobilize the linear displacement of the linear displacement section and thus immobilize deflection of the suspension link mechanism in a case in which the seating sensor has detected departure of the seated occupant from the vehicle seat body or in a case in which the buckle switch has detected the seated occupant removing the seatbelt. This enables the suspension seat to be stably immobilized at a position within its displacement range, and also enables the seated occupant to be prevented or suppressed from feeling discomfort as a result of the seat springing upward and contacting the seated occupant as the seated occupant gets up.

A suspension seat of a third aspect of the present disclosure is the suspension seat of the first aspect of the present disclosure or the second aspect of the present disclosure, wherein the locking mechanism is electrically or mechanically connected to an operation section that is installed in the vehicle cabin and that includes a lever or a switch, and linear displacement of the displaceable member is immobilized by driving the immobilizing member in a case in which an occupant has operated the operation section.

In the suspension seat of the third aspect of the present disclosure, the locking mechanism is electrically or mechanically connected to the operation section that is installed in the vehicle cabin and that includes a lever or a switch. This enables displacement of the displaceable member to be immobilized by driving the immobilizing member when the occupant has operated the operation section, thereby enabling the seated occupant to be prevented or suppressed from feeling discomfort as a result of the seat springing upward and contacting the seated occupant as the seated occupant gets up.

A suspension seat of a fourth aspect of the present disclosure is the suspension seat of any one of the first aspect of the present disclosure to the third aspect of the present disclosure, wherein the displaceable member is configured by a rack that is fixed to the linear displacement section at one end portion of the rack in a length direction running along a linear displacement direction, and a short direction end portion of the displaceable member is provided with a rack-tooth portion configuring the lockable portion and formed with teeth running along the length direction, and the immobilizing member is configured by a lock member provided with a meshing portion serving as the lock portion and formed with teeth that are configured to mesh with the rack-tooth portion.

In the suspension seat of the fourth aspect of the present disclosure, the displaceable member is configured by the rack provided with the rack-tooth portion formed with teeth running along the length direction at the short direction end portion of the displaceable member. The immobilizing member is configured by the lock member provided with the meshing portion formed with teeth that are configured to mesh with the rack-tooth portion. This enables linear displacement of the rack to be immobilized by meshing the meshing portion of the lock member with the rack-tooth portion. This enables the locking mechanism to be configured simply and also enables the suspension to be immobilized at a position within a vehicle vertical direction displacement range of the seat.

A suspension seat of a fifth aspect of the present disclosure is the suspension seat of the fourth aspect of the present disclosure, wherein the locking mechanism includes a drive device including an output shaft, a pinion gear that is fixed to the output shaft so as to be rotatable integrally with the output shaft, a pulling member that includes an end portion provided with a pinion meshing portion configured to mesh with the pinion gear, that includes an end portion on the opposite side from the pinion meshing portion and provided with a coupling portion coupled to the immobilizing member, and that swings in conjunction with rotation of the pinion gear so as to mesh the immobilizing member with the displaceable member or separate the immobilizing member from the displaceable member, and an anchor member that is provided at the pulling member and that is configured to anchor the immobilizing member at a portion of the immobilizing member on the opposite side from a side that meshes with the displaceable member when the immobilizing member meshes with the displaceable member.

In the suspension seat of the fifth aspect of the present disclosure, the locking mechanism is provided with the pulling member that causes the immobilizing member and the displaceable member to either mesh or separate from each other by swinging in conjunction with rotation of the pinion gear fixed to the output shaft of the drive device. This enables the suspension seat to be immobilized at a position within the vehicle vertical direction displacement range of the seat, and also, for example, enables the height position of the suspension seat to be finely adjusted by controlling the drive device. The pulling member is also provided with the anchor member that anchors the portion of the immobilizing member on the opposite side from the side the meshes with the displaceable member when the immobilizing member meshes with the displaceable member. This enables the immobilizing member and the displaceable member to mesh stably with each other. This in turn enables the suspension to be stably immobilized at a position within the vehicle vertical direction displacement range of the seat.

As described above, the suspension seat according to the present disclosure exhibits the excellent advantageous effects of enabling a locking mechanism to be provided with a simple configuration and of enabling a suspension to be immobilized at a position within a vehicle vertical direction displacement range of the seat.

BRIEF DESCRIPTION OF THE DRAWINGS

Exemplary embodiments of the present invention will be described in detail based on the following figures, wherein.

DETAILED DESCRIPTION

Figure 1:
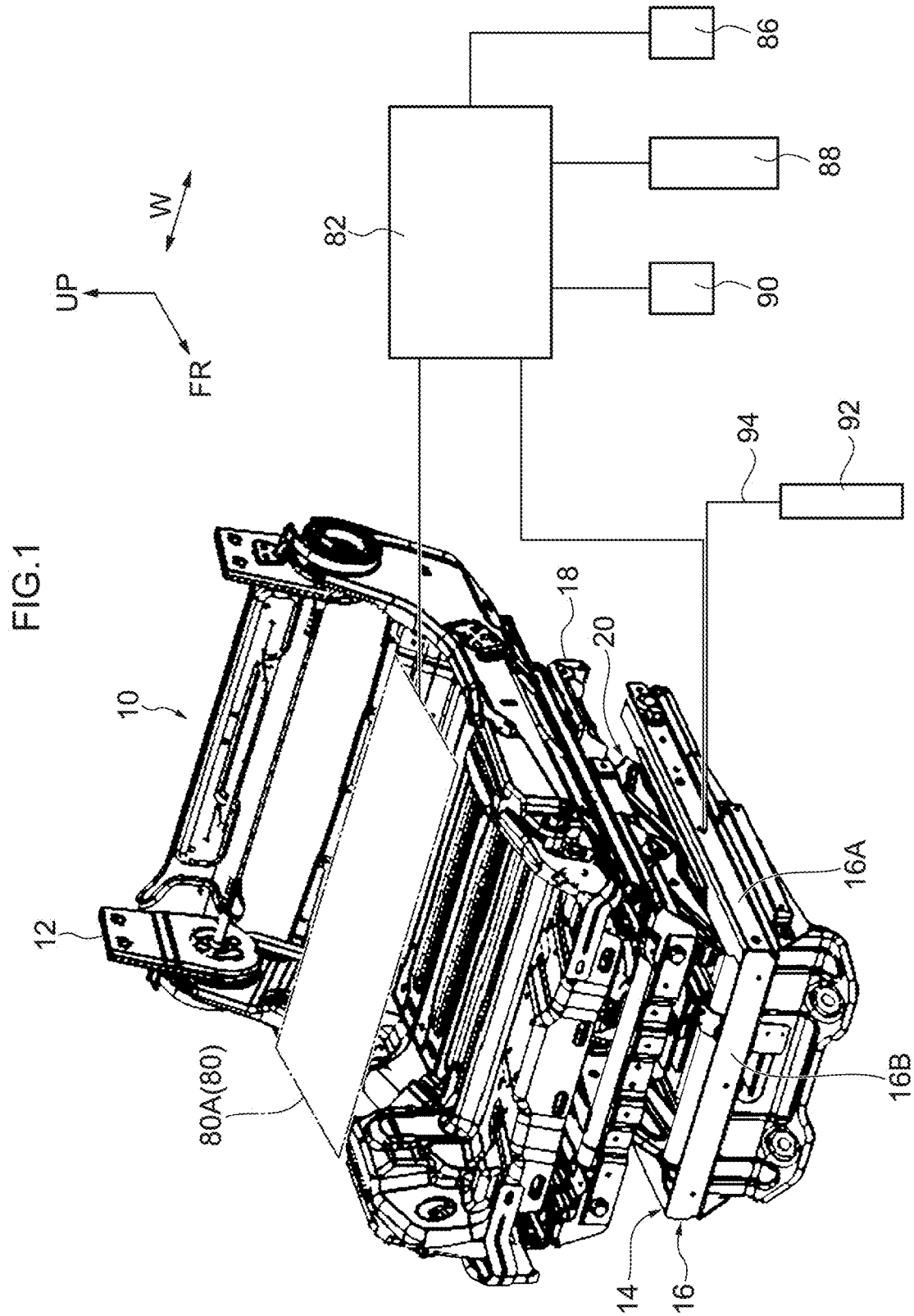
FIG. 1 is a block diagram and a perspective view to explain a schematic configuration of a suspension seat according to an exemplary embodiment.

Explanation follows regarding a suspension seat 10 serving as an example of an exemplary embodiment of the present disclosure, with reference to FIG. 1 to FIG. 7. In the drawings, the arrow FR indicates a seat front side, the arrow UP indicates a seat upper side, and the arrow W indicates a seat width direction. Note that in the present exemplary embodiment, the front side, upper side, and width direction of the suspension seat 10 correspond to a front side, an upper side, and a width direction of a vehicle. A right-hand direction is defined as a seat right side, and a left-hand direction is defined as a seat left side, when facing toward the seat front side.

Suspension

FIG. 1 is a perspective view illustrating an external appearance of the suspension seat 10. A suspension 14 is disposed at a seat lower side (vehicle lower side) of a seat body section 12 of the suspension seat 10. The suspension 14 includes a lower frame 16 serving as a lower side member forming a seat lower side, and an upper frame 18 serving as an upper side member forming a seat upper side (vehicle upper side). The suspension 14 also includes a suspension link mechanism 20 that couples the lower frame 16 and the upper frame 18 together and displaces the upper frame 18 in a seat vertical direction with respect to the lower frame 16.

Figure 2:
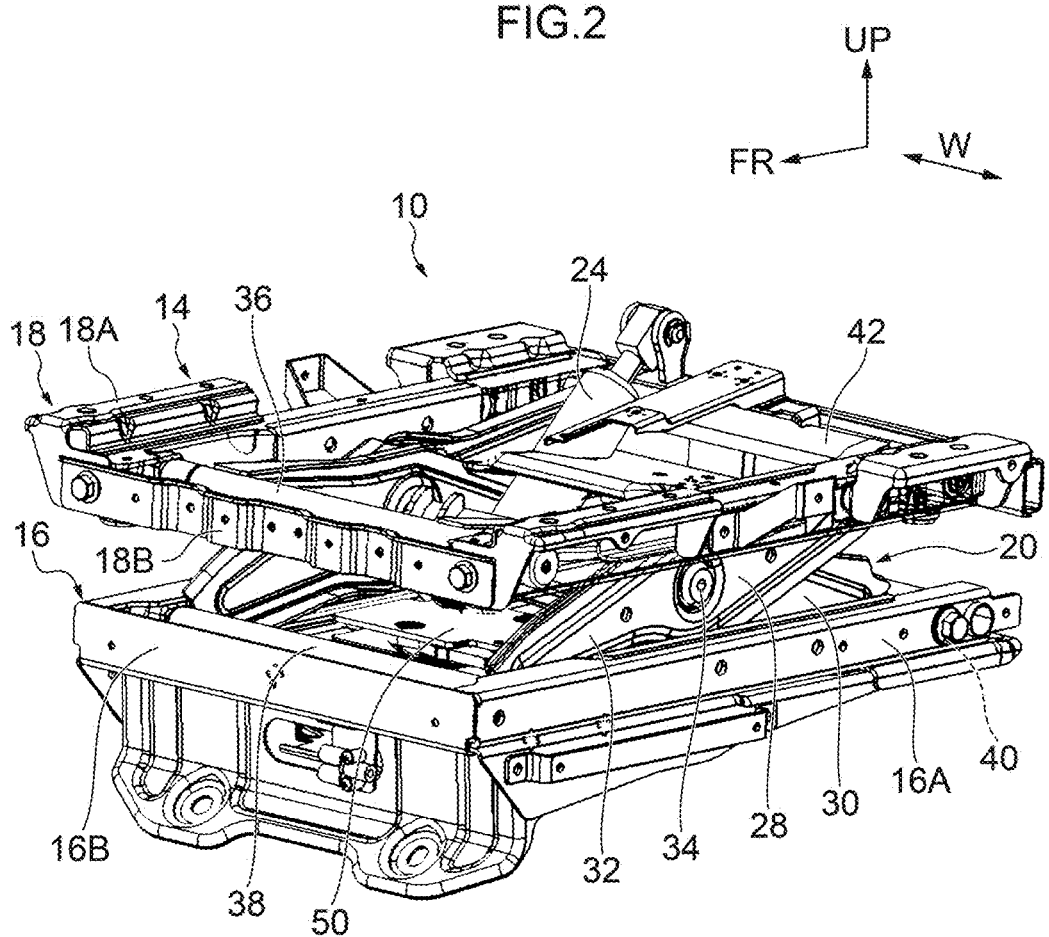
FIG. 2 is a perspective view of a suspension according to an exemplary embodiment.

A seat lower side portion of the lower frame 16 illustrated in FIG. 2 is fixed to a floor section of a vehicle cabin through seat rails (none of which are illustrated in the drawings). The suspension seat 10 is thereby fixed to the vehicle (not illustrated in the drawings). The lower frame 16 includes a left and right pair of rail members 16A that extend along a seat front-rear direction at the two seat width direction (vehicle width direction) end portions of the lower frame 16. The lower frame 16 also includes a front and rear pair of lateral members 16B that extend along the seat width direction at front and rear ends of the rail members 16A so as to couple the front ends and to couple the rear ends of the rail members 16A together. The lower frame 16 is thereby formed with substantially a frame shape in plan view.

The upper frame 18 is disposed at the seat upper side of the lower frame 16. The upper frame 18 includes a left and right pair of rail members 18A that extend along the seat front-rear direction at the two seat width direction end portions of the upper frame 18. The upper frame 18 also includes a front and rear pair of lateral members 18B that extend along the seat width direction at front and rear ends of the rail members 18A so as to couple the front ends and to couple the rear ends of the rail members 18A together. The upper frame 18 is thereby formed with substantially a frame shape in plan view. The upper frame 18 is disposed at the seat lower side of the seat body section 12 (see FIG. 1), serving as a vehicle seat body. The seat body section 12 is thereby supported from the seat lower side by the suspension 14.

Figure 3:
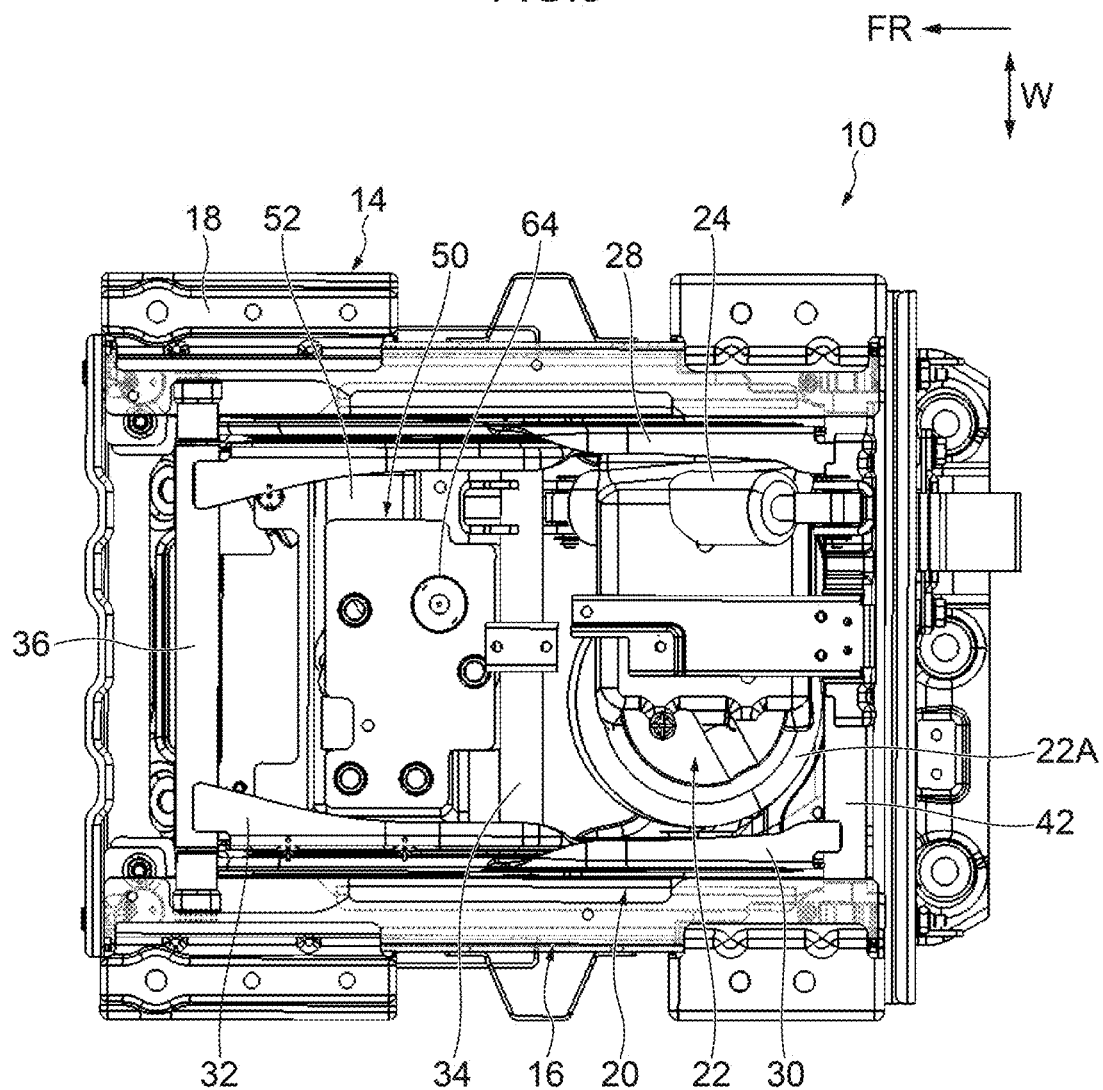
FIG. 3 is a plan view of a suspension according to an exemplary embodiment.

As illustrated in FIG. 2, the lower frame 16 is coupled to the upper frame 18 through the suspension link mechanism 20. As illustrated in FIG. 3, an air spring 22 is disposed between the lower frame 16 and the upper frame 18. The air spring 22 serves as a biasing unit to bias the upper frame 18 toward the seat upper side and generate a reaction force against load acting from the seat body section 12 side (seat upper side). A damper 24 in the form of a hydraulic cylinder is also provided as a damping unit to absorb vibration of the air spring 22. For example, compressed air is supplied to the air spring 22 through an air tube or the like running from an air compressor, serving as an air supply source, that configures an air brake device of the vehicle (none of which are illustrated in the drawings). The suspension link mechanism 20 is formed so as to be capable of extending and retracting in the seat vertical direction accompanying inflation and deflation of the air spring 22. The upper frame 18 and the seat body section 12 are thereby capable of being displaced along the seat vertical direction.

Suspension Link Mechanism

Figure 4:
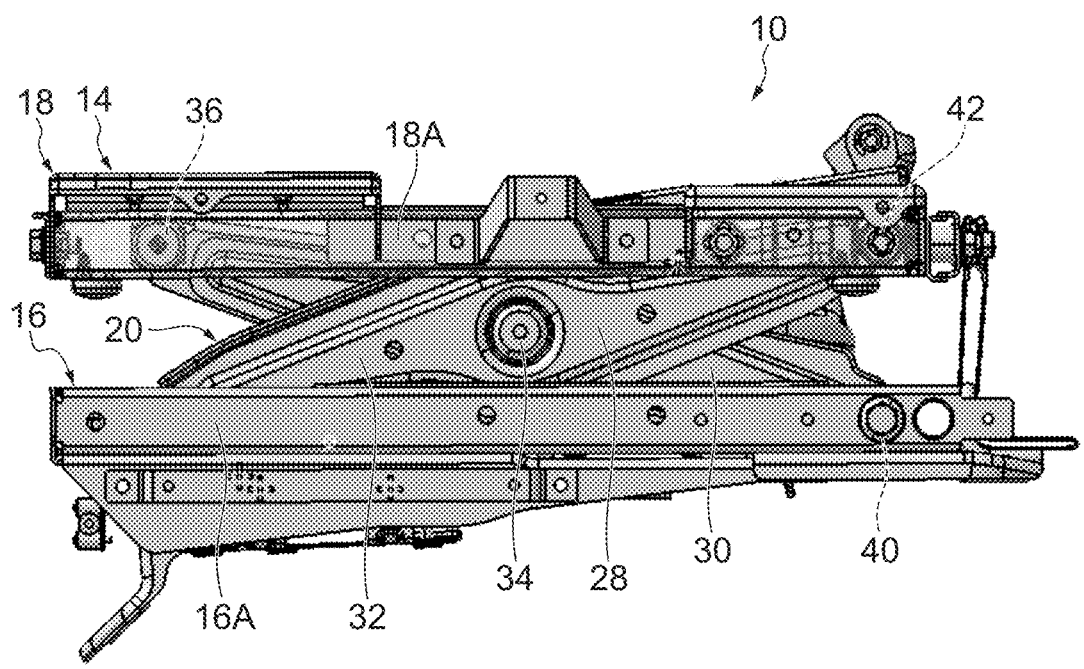
FIG. 4 is a side view of a suspension according to an exemplary embodiment.

As illustrated in FIG. 4, the suspension link mechanism 20 includes a left and right pair of X-links 28 that are respectively disposed at the two seat width direction end portions of the lower frame 16 and the upper frame 18. Each of the X-links 28 is configured by combining two link arms 30, 32 in an X shape. Intermediate portions of the two link arms 30, 32 of the left and right pair of X-links 28 are coupled together through a link shaft 34. Each of the X-links 28 is formed by combining the first link arm 30 that slopes toward the seat upper side on progression toward the seat front side and the second link arm 32 that slopes toward the seat lower side on progression toward the seat front side in an X shape through the link shaft 34 at the intermediate portions. The first link arm 30 and the second link arm 32 are thereby capable of rotating relative to each other about a pivot point at the link shaft 34.

As illustrated in FIG. 2, in the suspension link mechanism 20, a front-upper side movable shaft 36 is disposed corresponding to seat front side and seat upper side end portions of the first link arms 30. A front-lower side movable shaft 38, serving as a linear displacement section, is disposed corresponding to seat front side and seat lower side end portions of the second link arms 32.

As illustrated in FIG. 4, a lower side fixed shaft 40 is disposed corresponding to rear end portions of the first link arms 30. The lower side fixed shaft 40 extends along the seat width direction, and the two seat width direction end portions of the lower side fixed shaft 40 are respectively fixed to seat rear side and seat lower side end portions of the first link arms 30. The lower side fixed shaft 40 is rotatably supported by rear end portions of the respective rail members 16A of the lower frame 16.

As illustrated in FIG. 2, an upper side fixed shaft 42 is disposed corresponding to rear end portions of the second link arms 32. The upper side fixed shaft 42 extends along the seat width direction, and the two seat width direction end portions of the upper side fixed shaft 42 are respectively fixed to seat rear side and seat upper side end portions of the second link arms 32. The upper side fixed shaft 42 is rotatably supported by rear end portions of the respective rail members 18A of the upper frame 18.

The front-upper side movable shaft 36 that extends along the seat width direction with its two seat width direction end portions fixed to front end portions of the respective first link arms 30 is disposed between the front end portions of the first link arms 30 of the left and right pair of X-links 28.

The front-upper side movable shaft 36 spans between front end portions of the left and right pair of rail members 18A of the upper frame 18, and is supported so as to be capable of linear displacement in the seat front-rear direction along the rail members 18A.

The front-lower side movable shaft 38 that extends along the seat width direction with its two seat width direction end portions fixed to front end portions of the respective second link arms 32 is disposed between the front end portions of the second link arms 32 of the left and right pair of X-links 28.

The front-lower side movable shaft 38 spans between the front end portions of the left and right pair of rail members 16A of the lower frame 16, and is supported so as to be capable of linear displacement in the seat front-rear direction along the rail members 16A.

The upper frame 18 can be raised or lowered along the seat vertical direction by synchronously extending or retracting the left and right X-links 28 so as to pivot about the lower side fixed shaft 40 on the lower frame 16. Specifically, to displace (raise) the upper frame 18 toward the seat upper side, the first link arms 30 and the second link arms 32 move (angle toward the upright) such that their sloping directions approach the seat vertical direction. The front-upper side movable shaft 36 undergoes linear displacement toward the seat rear side so as to approach the upper side fixed shaft 42. The front-lower side movable shaft 38 undergoes linear displacement toward the seat rear side so as to approach the lower side fixed shaft 40. The X-links 28 thereby extend toward the seat upper side so as to displace (raise) the upper frame 18 toward the seat upper side.

To displace (lower) the upper frame 18 toward the seat lower side, the first link arms 30 and the second link arms 32 are moved (folded down) such that their sloping directions approach the seat front-rear direction. The front-upper side movable shaft 36 undergoes linear displacement toward the seat front side so as to separate from the upper side fixed shaft 42. The front-lower side movable shaft 38 undergoes linear displacement toward the seat front side so as to separate from the lower side fixed shaft 40. The X-links 28 thereby retract toward the seat lower side so as to displace (lower) the upper frame 18 toward the seat lower side.

Air Spring, Damper

As illustrated in FIG. 3, the air spring 22 is disposed within the frame shape of the lower frame 16 in a space toward the seat rear side. An upper end portion of the air spring 22 is fixed to a pressure-bearing plate 22A that is fixed to the first link arms 30 or the second link arms 32 and that is raised or lowered accompanying operation of the suspension link mechanism 20. The air spring 22 is for example supplied with compressed air through the air compressor (air supply source) configuring the air brake device of the vehicle. The air spring 22 thereby expands toward the seat upper side when supplied with air, and deflates toward the seat lower side when the air is expelled.

The load (weight) of an occupant seated on the seat body section 12 installed on the upper frame 18 is transmitted to (loaded onto) the air spring 22 through the pressure-bearing plate 22A. In a case in which the X-links 28 are not immobilized, in addition to the vibration absorption action of the damper 24, the load loaded onto the air spring 22 is buffered. The air spring 22 expands toward the seat upper side when supplied with air so as to raise the upper frame 18 and adjust a height position of the seat body section 12 toward the seat upper side. When air is expelled from the air spring 22, the air spring 22 deflates toward the seat lower side so as to lower the upper frame 18 and adjust the height position of the seat body section 12 toward the seat lower side.

Locking Mechanism

As illustrated in FIG. 3, a locking mechanism 50 for immobilizing deflection of the suspension link mechanism 20 is disposed substantially at a seat front-rear direction intermediate portion within the frame shape of the lower frame 16. Specifically, the locking mechanism 50 is fixed to an upper face of a plinth 52 by bolt fastening. The plinth 52 is formed in a plate shape extending along the seat width direction and spans between the left and right pair of rail members 16A of the lower frame 16.

Figure 5:
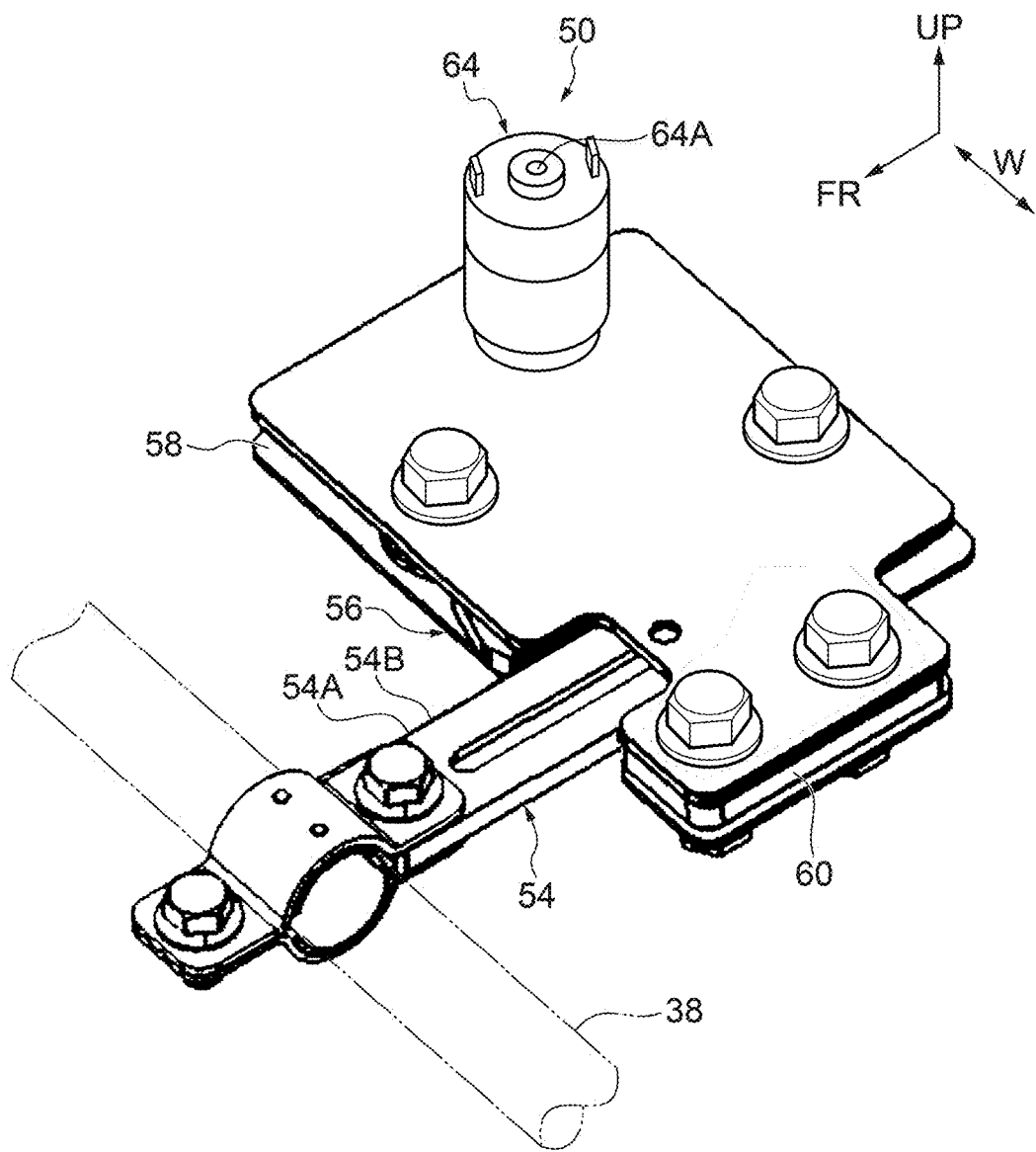
FIG. 5 is a perspective view of a locking mechanism according to an exemplary embodiment.

As illustrated in FIG. 5, the locking mechanism 50 includes a rack 54 serving as a displaceable member that is fixed to the front-lower side movable shaft 38 configuring the suspension link mechanism 20, and a lock member 56 serving as an immobilizing member for immobilizing the rack 54.

As illustrated in FIG. 5, the rack 54 and the lock member 56 are disposed on an upper face side of a base structure 58. The base structure 58 is formed in a substantially plate shape, and is formed such that an in-plane direction of the base structure 58 runs along the seat width direction and the seat front-rear direction. In the locking mechanism 50, a seat front side end portion of the rack 54 is fixed to the front-lower side movable shaft 38 so as to enable deflection of the suspension link mechanism 20 to be immobilized by immobilizing the rack 54 with the lock member 56.

The rack 54 is formed in a substantially elongated plate shape (a narrow plate shape) with its length direction along the seat front-rear direction. A front end portion, serving as one end portion, of the rack 54 is fixed to the front-lower side movable shaft 38, and the rack 54 is disposed on the upper face of the base structure 58 so as to be capable of sliding against the base structure 58 along the seat front-rear direction. Thus, when the front-lower side movable shaft 38 undergoes linear displacement along the seat front-rear direction, the rack 54 is capable of undergoing linear displacement along the seat front-rear direction together with the front-lower side movable shaft 38. A base plate 60 is also disposed on the base structure 58. The base plate 60 has a length direction running along the seat front-rear direction and is formed in a substantially elongated plate shape running along a seat left side peripheral edge portion of the rack 54. The rack 54 thereby undergoes displacement along the length direction of the base plate 60. This enables the rack 54 to be stably displaced along the seat front-rear direction.

A rack-tooth portion 54A, serving as a lockable portion, is provided running along the length direction (seat front-rear direction) at one short direction end portion (a seat right side end portion), serving as another end portion, of the rack 54. Specifically, the rack-tooth portion 54A is formed to a seat right side peripheral edge portion 54B configuring one short direction end portion of the rack 54. Teeth are formed at all length direction locations of the peripheral edge portion 54B that can be immobilized by the lock member 56.

The lock member 56 is disposed on the seat right side of the rack 54. The lock member 56 is formed in a substantially elongated plate shape (a narrow plate shape) running along the seat front-rear direction. A first hole 56A is formed penetrating the seat rear side of the lock member 56 in the seat vertical direction (plate thickness direction). The lock member 56 is disposed on the upper face of the base structure 58 so as to be capable of swinging about a first shaft portion 62. The first shaft portion 62 is disposed running through the first hole 56A, and a lower end of the first shaft portion 62 is fixed to the base structure 58.

The lock member 56 includes a meshing portion 56B, serving as a lock portion that is formed with teeth at an end portion on a side opposing the rack-tooth portion 54A. Meshing the meshing portion 56B with the rack-tooth portion 54A enables the rack 54 to be immobilized against linear displacement, thereby immobilizing deflection of the suspension link mechanism 20 (see FIG. 4).

Figure 6:
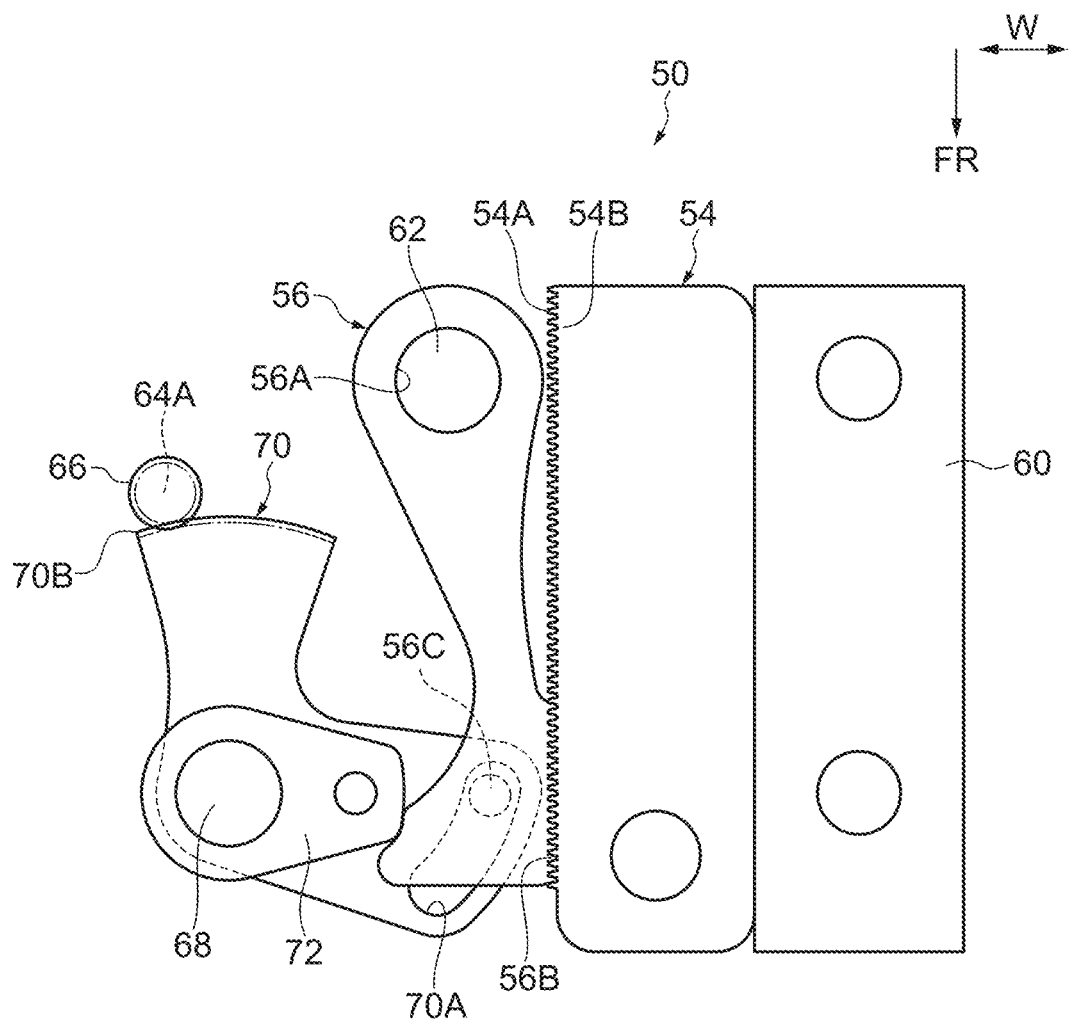
FIG. 6 is a plan view illustrating a meshed state of an immobilizing member and a displaceable member according to an exemplary embodiment.

As illustrated in FIG. 5, a motor 64, serving as a drive device, is provided at the locking mechanism 50. As illustrated in FIG. 6, a pinion gear 66 is fixed to an output shaft 64A of the motor 64. The pinion gear 66 is formed so as to be rotatable integrally with the output shaft 64A when the motor 64 is driven.

Figure 7:
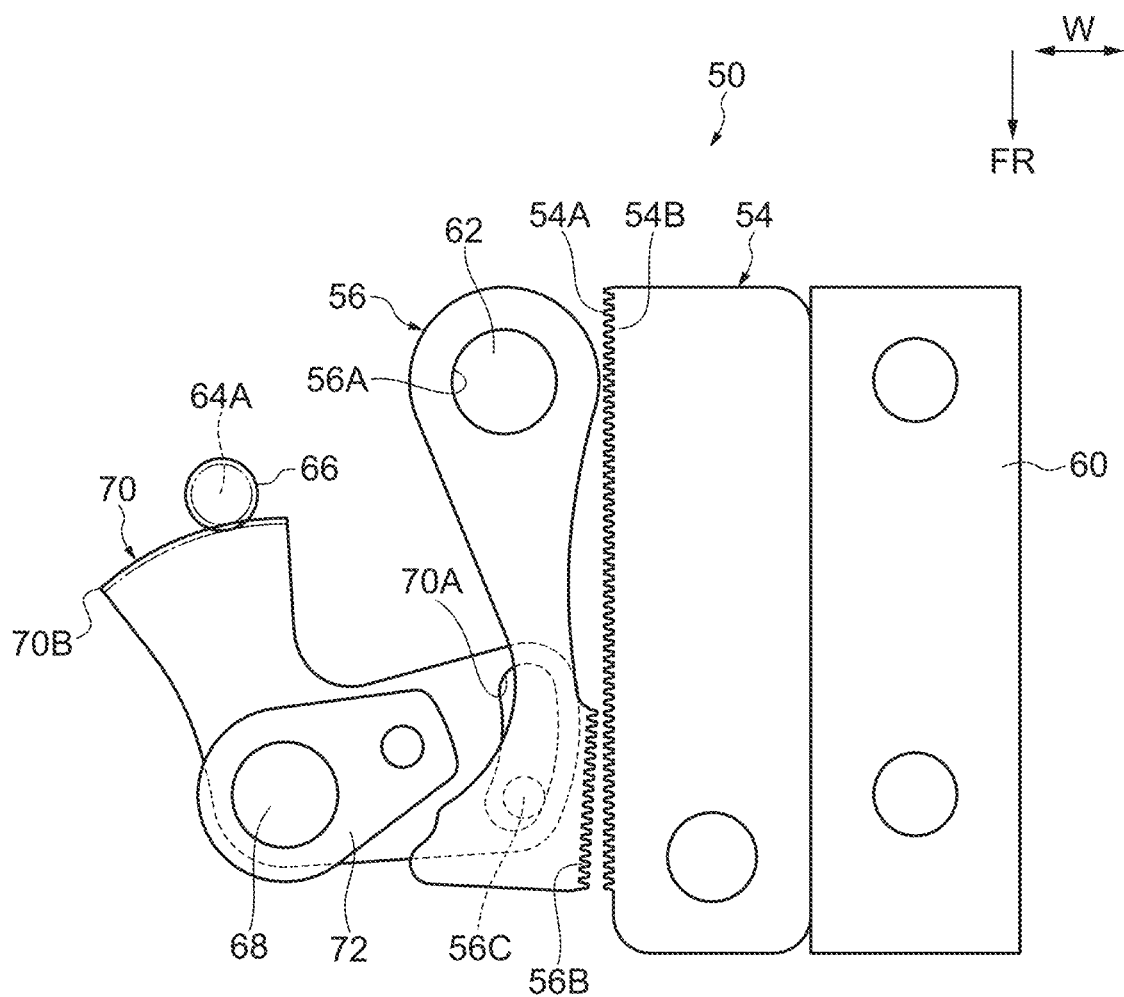
FIG. 7 is a plan view illustrating a separated state of an immobilizing member and a displaceable member according to an exemplary embodiment.

A guide plate 70, serving as a pulling member that is capable of swinging about a swing shaft 68, is disposed on the upper face of the base structure 58. The pinion gear 66 meshes with a pinion meshing portion 70B. The pinion meshing portion 70B is configured by teeth formed at a seat right side and seat rear side end portion of the guide plate 70 so as to be capable of meshing with the pinion gear 66. A hole 70A is formed penetrating a seat left side and seat front side end portion of the guide plate 70, this portion serving as an end portion of the guide plate 70 on the opposite side from the pinion meshing portion 70B. The hole 70A follows the outer peripheral profile of the seat left side and seat front side end portion of the guide plate 70, and serves as a coupling portion. A projection portion 56C that is formed in a substantially circular cylindrical shape projecting toward the seat lower side is provided at the lock member 56 at a position overlapping the hole 70A in the seat vertical direction. The guide plate 70 is disposed at the seat lower side of the lock member 56 in a state in which the projection portion 56C is inserted through the hole 70A. Thus, when the guide plate 70 is swung, the projection portion 56C of the lock member 56 slides inside the hole 70A so as to swing the lock member 56 about the first shaft portion 62. This enables the lock member 56 to mesh with the rack 54. As illustrated in FIG. 7, in a case in which the motor 64 is driven so as to rotate in the reverse direction to a direction that causes the lock member 56 to mesh with the rack 54, the guide plate 70 is rotated in the reverse direction to a direction that causes the lock member 56 to mesh with the rack 54. This enables the lock member 56 separate from the rack 54.

As illustrated in FIG. 6, an anchor member 72 is provided at the seat upper side of the guide plate 70. One end portion of the anchor member 72 is fixed to the guide plate 70, and the other end portion of the anchor member 72 is attached to the swing shaft 68 so as to be capable of swinging about the axis of the swing shaft 68. This enables the lock member 56 to be anchored at a location on the opposite side from the side of the lock member 56 that meshes with the rack 54 when the lock member 56 is meshed with the rack 54. This enables the lock member 56 to be stabilized when immobilizing the rack 54.

As illustrated in FIG. 1, a seating sensor 80 is disposed inside a seat cushion (not illustrated in the drawings) disposed at the seat upper side of the seat body section 12. The seating sensor 80 includes a sensor portion 80A at one end portion on the side where the seat cushion is disposed. For example, the sensor portion 80A includes electrodes such as piezoelectric elements, and is disposed inside the seat cushion (not illustrated in the drawings) such that these electrodes are disposed at locations pressed (applied with load) by an occupant sitting on the seat cushion.

Another end portion of the seating sensor 80 is electrically connected to an electronic control unit (ECU) 82 (see the block diagram element of FIG. 1) through a connector, not illustrated in the drawings. The motor 64 of the locking mechanism 50 is similarly electrically connected to the ECU 82. The seating sensor 80 and the locking mechanism 50 are thereby electrically connected together through the ECU 82. Note that the seating sensor 80 functions as a load sensor to detect the load of a seated occupant, and the ECU 82 functions as a mechanism to determine when an occupant sits down or gets up. Specifically, the ECU 82 detects resistance values between the plural electrodes provided at the seating sensor 80. For example, the ECU 82 detects whether or not an occupant is sitting on the seat body section 12 by determining whether or not the resistance values of electrodes that are pressed when an occupant sits down are different from the resistance values of the electrodes when not being pressed, namely in a state in which the occupant is not seated. The ECU 82 also detects whether or not the occupant is getting up from the seat body section 12 by determining whether or not the electrode resistance values are different from those in a state in which the occupant is seated.

The ECU 82 is electrically connected to a buckle switch 86 provided in order to detect attachment or detachment of a seatbelt with respect to a seatbelt buckle of a seatbelt device installed in the vehicle cabin (none of which are illustrated in the drawings). The buckle switch 86 is electrically connected to the locking mechanism 50 through the ECU 82. The locking mechanism 50 is configured to operate in conjunction with the seatbelt being done up or undone by the occupant. Specifically, in a case in which the occupant has removed the seatbelt, the motor 64 of the locking mechanism 50 is operated so as to swing the lock member 56 in the direction to mesh with the rack 54.

The ECU 82 is electrically connected to a shift lever 88, serving as an operation section disposed in the vehicle cabin for operation of the vehicle transmission (not illustrated in the drawings). The shift lever 88 includes a lever formed in substantially a rod shape. Although the transmission described in the following explanation is an automatic transmission, there is no limitation thereto, and the transmission may be a manual transmission. The shift lever 88 is electrically connected to the locking mechanism 50 through the ECU 82, and the locking mechanism 50 is configured so as to operate in conjunction with operation of the shift lever 88. Specifically, when an occupant places the shift lever 88 in a reverse range or places the shift lever 88 in a parking range, the motor 64 of the locking mechanism 50 is operated so as to swing the lock member 56 in the direction to mesh with the rack 54.

A lock switch 90, serving as an operation section, is provided at an instrument panel (not illustrated in the drawings) at a front section of the vehicle cabin, at the vehicle front side of the suspension seat 10. The lock switch 90 includes a switch that can be switched on or off manually by the occupant. The lock switch 90 is electrically connected to the locking mechanism 50 through the ECU 82, and the locking mechanism 50 is configured so as to operate in conjunction with operation of the lock switch 90. Specifically, when the occupant switches the lock switch 90 to ON, the motor 64 of the locking mechanism 50 is operated so as to swing the lock member 56 in the direction to mesh with the rack 54. When the occupant switches the lock switch 90 to OFF, the motor 64 of the locking mechanism 50 is operated so as to swing the lock member 56 in a direction to separate from the rack 54.

The locking mechanism 50 is for example mechanically connected through a cable 94 to a handbrake 92, serving as an operation section disposed on the seat right side or seat left side of the suspension seat 10. The lock member 56 is swung in the direction to mesh with the rack 54 when the occupant pulls a lever (not illustrated in the drawings) of the handbrake 92. Moreover, the lock member 56 swings in the direction to separate from the rack 54 when the occupant lowers the lever of the handbrake 92.

Operation and Advantageous Effects

Next, explanation follows regarding operation and advantageous effects of the present exemplary embodiment.

In the suspension seat 10 according to the present exemplary embodiment, the locking mechanism 50 includes the rack 54 that is capable of undergoing displacement along the displacement direction of the front-lower side movable shaft 38, and the lock member 56 that is capable of immobilizing a seat right side end portion of the rack 54 at a position within a displacement range of the rack 54. The rack 54 is formed with a substantially elongated plate shaped overall profile. The seat front side end portion of the rack 54 is fixed to the front-lower side movable shaft 38 and runs along the linear displacement direction of the front-lower side movable shaft 38. The lock member 56 is also formed with a substantially elongated plate shaped overall profile, and is capable of immobilizing the seat right side end portion of the rack 54 that undergoes linear displacement integrally with the front-lower side movable shaft 38. This enables the locking mechanism 50 to be simply configured by the rack 54 and the lock member 56.

In the suspension seat 10 according to the present exemplary embodiment, the rack 54 includes the rack-tooth portion 54A formed with teeth along its length direction at the location of the one short direction peripheral edge portion that is immobilized by the lock member 56. The lock member 56 includes the meshing portion 56B formed with teeth at the seat left side end portion on the side opposing the rack-tooth portion 54A. This enables linear displacement of the rack 54 to be immobilized by the lock member 56 by meshing the meshing portion 56B with the rack-tooth portion 54A. This enables the locking mechanism 50 to be simply configured, and enables the suspension seat 10 to be stably immobilized at a position within the range of seat vertical direction displacement.

In the suspension seat 10 according to the present exemplary embodiment, the locking mechanism 50 includes the guide plate 70 that causes the lock member 56 and the rack 54 to either mesh or separate from each other by swinging in conjunction with rotation of the pinion gear 66 fixed to the output shaft 64A of the motor 64. This enables the suspension seat 10 to be immobilized at a position within its displacement range, and for example enables the height position of the suspension seat 10 to be finely adjusted by controlling the motor. The guide plate 70 is provided with the anchor member 72 that anchors the portion of the lock member 56 on the opposite side from the side of the lock member 56 that meshes which the rack 54 when the lock member 56 meshes with the rack 54. The lock member 56 thus enables the rack 54 to be meshed stably. This enables the suspension seat 10 to be stably immobilized at a position within its seat vertical direction displacement range.

As described above, the suspension seat 10 according to the present exemplary embodiment enables provision of the locking mechanism 50 that has a simple configuration and is capable of immobilizing the suspension link mechanism 20 at a position within the seat vertical direction displacement range of the seat body section 12.

In the suspension seat 10 according to the present exemplary embodiment, the locking mechanism 50 is electrically connected to the seating sensor 80 disposed in the seat body section 12 through the ECU 82. The lock member 56 immobilizes the rack 54 in a case in which the seating sensor 80 has detected departure of the seated occupant from the seat body section 12, enabling the locking mechanism 50 to immobilize displacement of the front-lower side movable shaft 38 and immobilize deflection of the suspension link mechanism 20. This enables the suspension seat 10 to be stably immobilized at a position within its displacement range, and also enables the seated occupant to be prevented or suppressed from feeling discomfort as a result of the seat body section 12 springing upward and contacting the seated occupant as the seated occupant gets up.

In the suspension seat 10 according to the present exemplary embodiment, the locking mechanism 50 is electrically connected to the buckle switch 86 provided with the seatbelt buckle. This enables the lock member 56 to be swung in the direction to mesh with the rack 54 and thus immobilize deflection of the suspension seat 10 when the seated occupant has removed the seatbelt. This enables the seat body section 12 to be prevented from springing upward directly prior to the seated occupant getting up, thereby enabling the seated occupant to be prevented or suppressed from feeling discomfort.

In the suspension seat 10 according to the present exemplary embodiment, the locking mechanism 50 is electrically connected to the shift lever 88 and mechanically connected to the handbrake 92. This enables deflection of the suspension link mechanism 20 to be immobilized when the occupant has placed the shift lever 88 in the parking range or when the occupant has applied the handbrake 92. This enables deflection of the suspension seat 10 to be immobilized in conjunction with the actions of the vehicle, thereby enabling the seat body section 12 to be prevented from springing upward when the seated occupant gets up, and thus enabling the seated occupant to be prevented or suppressed from feeling discomfort. Moreover, deflection of the suspension seat 10 may also be immobilized when the occupant places the shift lever 88 in the reverse range. This for example enables the posture of the occupant to be stabilized if the occupant leans their upper body out of a window of the vehicle when reversing the vehicle.

In the suspension seat 10 according to the present exemplary embodiment, the locking mechanism 50 is electrically connected to the lock switch 90 provided on the instrument panel. This enables the suspension seat 10 to be immobilized at a desired position and timing, and also enables the seated occupant to be prevented or suppressed from feeling discomfort as a result of the seat body section 12 springing upward and contacting the seated occupant when the seated occupant gets up.

Note that although the suspension link mechanism 20 is configured by the X-links 28 in the above description, there is no limitation thereto. Another configuration may be applied as the suspension link mechanism, for example a configuration in which a shaft portion that is capable of extending and retracting along the seat vertical direction is provided at the seat lower side of an upper side member.

Note that although the lower frame 16 and the upper frame 18 are each formed with substantially a frame shape in the above description, there is no limitation thereto. For example, a lower frame and an upper frame may respectively be formed with plate shapes.

Note that although the lock member 56 is applied as the immobilizing member in the above description, there is no limitation thereto. Another configuration may be applied as the immobilizing member, for example a solenoid including a plunger to which a metal displaceable member is coupled.

Note that although the locking mechanism 50 is provided with the motor 64 serving as a drive device in the above description, there is no limitation thereto. For example, a configuration in which an immobilizing member is manually operated using a handle to immobilize the displaceable member may be applied as the locking mechanism.

Note that although the locking mechanism 50 is configured capable of immobilizing deflection of the suspension link mechanism 20 when the seated occupant is detected to be getting up from the seat body section 12 in the above description, there is no limitation thereto. The locking mechanism may for example be controlled so as to be capable of immobilizing deflection of a suspension link mechanism so as to prevent or suppress resonance between the vehicle body and the suspension when vibration of the vehicle or a vehicle seat is detected to have become large during travel.

Although the locking mechanism 50 is electrically connected to the seating sensor 80 through the ECU 82 in the above description, there is no limitation thereto. A controller including a CPU or the like may be provided at a locking mechanism, with a direct electrical connection between a seating sensor and the controller.

Although the locking mechanism 50 is electrically connected to both the seating sensor 80 and the buckle switch 86 through the ECU 82 in the above description, there is no limitation thereto. Configuration may be such that only one out of a seating sensor or a buckle switch is electrically connected to a locking mechanism configured to operate in conjunction with the seating sensor or the buckle switch.

Although the lock switch 90 is provided at the instrument panel in the above description, there is no limitation thereto. The lock switch 90 may for example be provided at a seat body, or at another location inside the vehicle cabin, such as on an armrest or a center console.

What is claimed is:

1. A suspension seat comprising a suspension which comprises:
   a lower side member that forms a portion of the suspension, at a vehicle lower side in a vehicle vertical direction, and that is coupled to a floor section of a vehicle cabin;
   an upper side member that forms a portion of the suspension, at a vehicle upper side in the vehicle vertical direction, that is disposed at the vehicle lower side of a vehicle seat body, and that is configured to support the vehicle seat body from the vehicle lower side;
   a suspension link mechanism that includes a vehicle lower side portion coupled to the lower side member and a vehicle upper side portion coupled to the upper side member, and that undergoes displacement so as to displace the upper side member along the vehicle vertical direction;
   a linear displacement section that is provided at the suspension link mechanism and is configured to undergo linear displacement in conjunction with displacement of the suspension link mechanism;
   a biasing unit that is provided at the vehicle lower side of the upper side member and is configured to bias the upper side member toward the vehicle upper side;
   a damping unit that includes an end portion coupled to the suspension link mechanism at the vehicle lower side of the upper side member and that is configured to absorb vibration generated at the suspension link mechanism; and
   a locking mechanism that immobilizes the linear displacement section so as to immobilize displacement of the suspension link mechanism, the locking mechanism including a displaceable member having one end portion fixed to the linear displacement section and configured to undergo linear displacement integrally with the linear displacement section along a displacement direction of the linear displacement section, and having another end portion provided with a lockable portion, the locking mechanism including an immobilizing member provided on a side of the another end portion of the displaceable member and including a lock portion formed at a portion of the immobilizing member opposing the lockable portion and configured to immobilize the lockable portion at a position within a displacement range of the displaceable member,
   wherein the displaceable member is configured to be displaced linearly along a front-rear direction of the suspension seat, and
   wherein the immobilizing member faces the displaceable member in a width direction of the suspension seat and swings about a shaft portion extending along a vertical direction of the suspension seat to engage the lock portion thereof with the lockable portion of the displaceable member.

2. The suspension seat of claim 1 further comprising a seating sensor disposed in the vehicle seat body or a buckle switch, which is configured to detect attachment and detachment of a seatbelt with respect to a seatbelt buckle of a seatbelt device installed in the vehicle cabin,
   wherein the locking mechanism is electrically connected to the seating sensor or the buckle switch and the linear displacement of the displaceable member is immobilized by driving the immobilizing member in a case in which the seating sensor has detected departure of a seated occupant from the vehicle seat body, or in a case in which the buckle switch has detected the seated occupant removing the seatbelt.

3. The suspension seat of claim 1 further comprising
   an operation section that is installed in the vehicle cabin and that includes a lever or a switch,
   wherein the locking mechanism is electrically or mechanically connected to the operation section and the linear displacement of the displaceable member is immobilized by driving the immobilizing member in a case in which an occupant has operated the operation section.

4. The suspension seat of claim 1, wherein:
   the displaceable member is configured by a rack that is fixed to the linear displacement section at one end portion of the rack in a length direction running along a linear displacement direction, and a short direction end portion of the displaceable member is provided with a rack-tooth portion configuring the lockable portion and formed with teeth running along the length direction; and
   the immobilizing member is configured by a lock member provided with a meshing portion serving as the lock portion and formed with teeth that are configured to mesh with the rack-tooth portion.

5. The suspension seat of claim 4, wherein the locking mechanism includes:
   a drive device including an output shaft;
   a pinion gear that is fixed to the output shaft so as to be rotatable integrally with the output shaft;
   a pulling member that includes an end portion provided with a pinion meshing portion configured to mesh with the pinion gear, that includes an end portion on the opposite side from the pinion meshing portion and provided with a coupling portion coupled to the immobilizing member, and that swings in conjunction with rotation of the pinion gear so as to mesh the immobilizing member with the displaceable member or separate the immobilizing member from the displaceable member; and
   an anchor member that is provided at the pulling member and that is configured to anchor the immobilizing member at a portion of the immobilizing member on the opposite side from a side that meshes with the displaceable member when the immobilizing member meshes with the displaceable member.

\* \* \* \* \*